May 25, 1965 W. A. HOYER ETAL 3,185,849
PULSED NEUTRON SOURCE UTILIZING AN ACCELERATOR TUBE
Filed Nov. 30, 1962
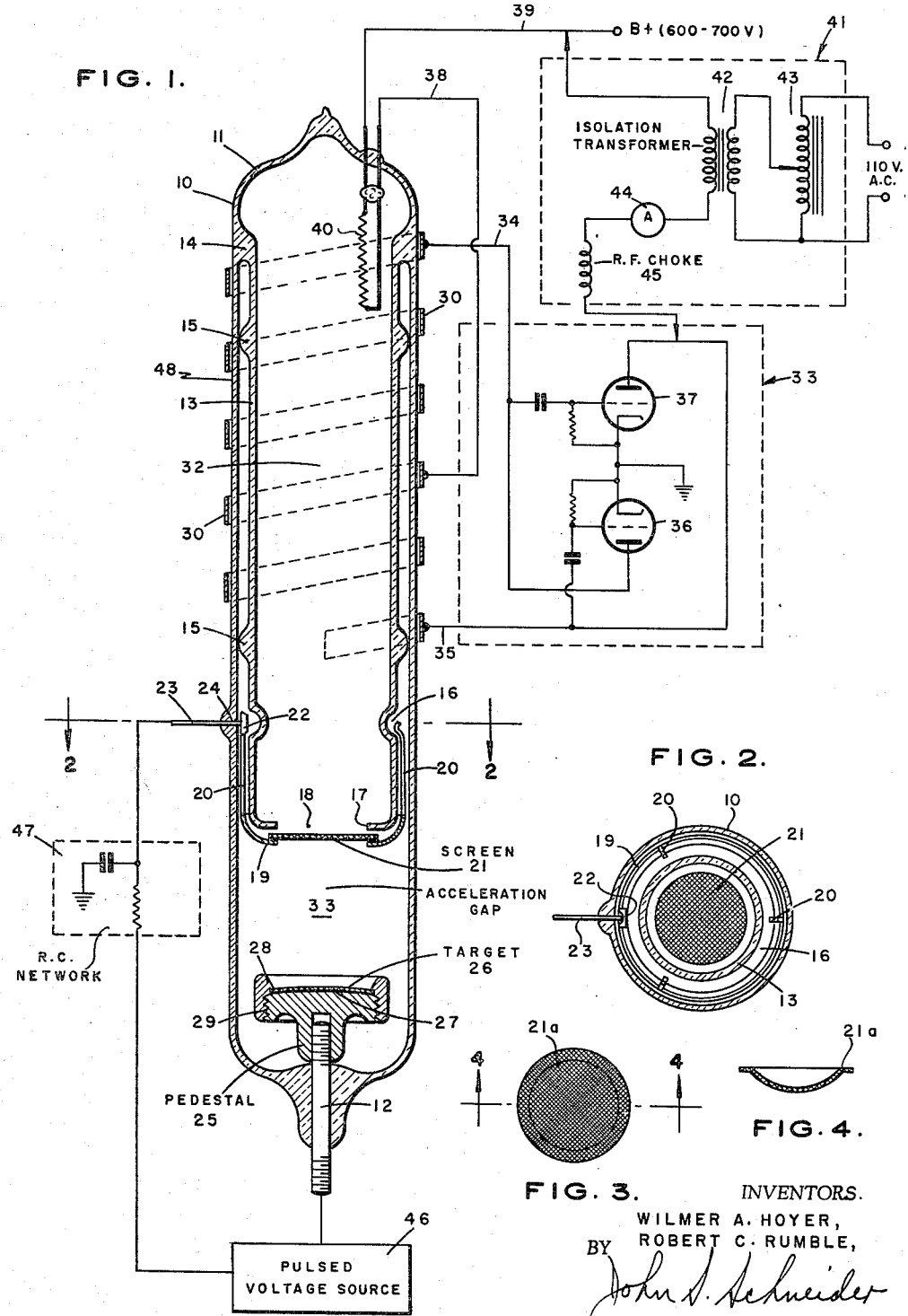
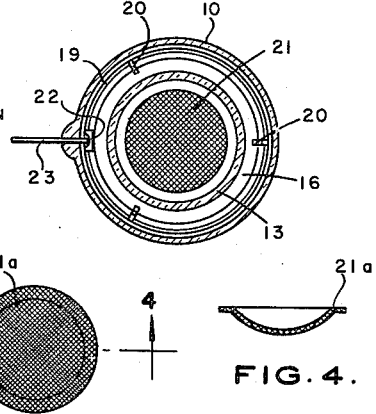
INVENTORS.
WILMER A. HOYER,
ROBERT C. RUMBLE,
BY
ATTORNEY.

3,185,849
PULSED NEUTRON SOURCE UTILIZING AN ACCELERATOR TUBE
Wilmer A. Hoyer and Robert C. Rumble, Houston, Tex., assignors, by mesne assignments, to Esso Production Research Company, Houston, Tex., a corporation of Delaware
Filed Nov. 30, 1962, Ser. No. 241,444
4 Claims. (Cl. 250—84.5)

The present invention concerns an ion source neutron generator primarily adaptable for use in a logging sonde designed to investigate subsurface earth formations.

A direct and accurate way to determine the nature of underground mineral deposits is to ascertain the chemical elements located in the subsurface formations.

One desirable method for locating chemical elements in subsurface formations consists of bombarding the formations surrounding a borehole with high energy neutrons (14 mev.) generated in the borehole and observing the gamma rays resulting from reactions of the neutrons with the chemical elements of the formations. The neutron generator for the bombarding neutrons is pulsed to optimize the detection of gamma rays resulting from inelastic neutron scattering reactions.

One type of particle accelerator that has been used to produce bursts of neutrons in boreholes utilizes ion generating accelerating apparatus for directing high-speed ions at a suitable target to cause emission of neutrons. Depending upon the type reaction (D-T or D-D) that is employed, either deuterium or tritium ion plasma is maintained by means of a radio frequency field and these ions are extracted by an extraction voltage and accelerated to the required reaction velocity by means of a high potential gradient. The accelerated ions are directed at the tritium or deuterium containing target, and interaction of the high-speed ions and the tritium or deuterium in the target causes emission of neutrons.

The neutron generator of the present invention is of this type and briefly comprises a closed accelerator tube containing an open-ended cylinder sealed inside the tube; an extraction electrode arranged adjacent one end of said cylinder and including a screen dividing the tube into an ionizing chamber and an accelerating chamber; deuterium or tritium plasma contained in the ionizing chamber; means for ionizing the plasma; target material positioned adjacent the lower end of the accelerating chamber; and means for supplying high voltage pulses to said target and extraction voltage pulses to said extraction electrode. The tube also contains control means mounted in the accelerator tube for adjusting the pressure of the deuterium or tritium gas within the tube to reactivate it. The screen electrode is preferably formed concave-convex with the sizes of the screen openings increasing in a radial gradation. A delay network in the extraction circuit provides an economical introduction of ions into the accelerating chamber or gap.

A primary object of the present invention is to provide an improved ion source neutron generator that is operable, economical, and capable of operating inside a logging sonde of small bore.

The above object and other objects and advantages of the invention will be apparent from a more detailed description of the invention when taken with the drawings wherein:

FIG. 1 is a sectional view of the accelerator tube of the invention showing therewith diagrammatically various electrical circuits including an R-C delay network, an oscillator circuit, and a gas pressure control circuit;

FIG. 2 is a view taken along lines 2—2 of FIG. 1;

FIG. 3 is a plan view of the preferred type screen that may be used in the tube of FIG. 1; and FIG. 4 is a view taken along lines 4—4 of FIG. 3.

For a more complete description of the invention, reference now is made to the drawings in greater detail. In FIG. 1 is shown a glass envelope or tube 10 closed at its upper end as at neck portion 11 and at its lower end by a Kovar conductor rod 12 threaded at each end and sealed thereto. An open-ended inner concentric glass cylinder 13 is attached to and supported within tube 10 by means of a ring seal 14, and is maintained substantially in place by means of spaced-apart protuberances 15 formed on the outer surface of cylinder 13. An annular groove 16 is formed above and adjacent the lower open end of cylinder 13 which is squared off as at 17 to provide an opening 18 of reduced diameter.

A preformed extraction electrode 19 is attached to the lower end of cylinder 13 by means of three preformed, stainless steel spring members 20, the upper ends of which engage groove 16 (see also FIG. 2). Another stainless steel spring contact member 22 maintains electrical contact with a tungsten rod extraction lead 23, which extends through tube 10 at 24. Spring member 22 is grooved to maintain electrical contact with tungsten rod 23 and prevent rotation of extraction electrode 19. A steel screen member 21 of a desired gauge and size is positioned on extraction electrode 19 over the opening therein in alignment with hole 18.

A domed target pedestal 25 is threaded to the upper end of rod 12, and serves both as a mechanical support for tube 10 and as an electrical lead through to a convex disc-shaped target 26 which is mounted on pedestal 25 and urged into close heat-conducting contact with the domed surface 27 of pedestal 25 by a hollow ring 28 threaded thereto. Ring 28 has a raised rim as shown to shape the high voltage field configuration in the accelerating gap and cause divergence of the ion beam impinging on target 26.

Target 26 may be a thin disc of some metal such as platinum, copper, molybdenum, stainless steel, nickel, or the like, on one surface of which has been evaporated some stable hydrogen-absorbing metal such as zirconium. Deuterium targets may be formed naturally inside accelerator tube 10 if target blanks covered with evaporated zirconium are subjected to impingement by deuterium ions accelerated by high voltage across the accelerating gap. Deuterium atoms adsorbed in the zirconium layer become target atoms. Tritium targets are made by subjecting target blanks to a tritium atmosphere under controlled conditions of temperature and pressure.

A high-frequency, thin, preformed copper strip coil 30 surrounds the upper portion of tube 10. It may be held in place on tube 10 by an adhesive, or it may be formed directly on tube 10 by electrolytic deposition. The copper strip coil enhances the energy coupling to the ion plasma over that achieved with conventional copper tubing coils. It may be made of any other good conducting material besides copper such as silver, etc.

Deuterium or tritium ion plasma 32 is interspersed throughout the interior of inner cylinder 13 and is maintained by interaction with high-frequency current flowing through coil 30.

A high-frequency oscillator circuit shown in dashed line block 33 includes leads 34 and 35 which couple the ends of coil 30 to two vacuum tubes 36 and 37 and a lead 38 which connects an intervening point on coil 30 to B+ lead 39 through a tungsten filament 40. This is preferably a 45 megacycle oscillator of about 40 watts power output. During pulsing of the tube, high-frequency coil 30 preferably is charged to 600–700 volts positive to power the oscillator.

Filament 40 extends into plasma 32 near the apex of tube 10 and together with a helical coil of fine zirconium wire closely wrapped about the tungsten filament serves to lower or raise the plasma pressure inside tube 10 to reactivate tubes that have become inoperative because of excessive or insufficient plasma pressure. The plasma pressure is regulated by the amount of current flowing through filament 40 and a circuit for controlling this current, shown in dashed line block 41, is attachable to oscillator circuit 33. The control circuit includes an isolation transformer 42, the primary of which is connected to a 110 volt A.C. source through a variac 43. One terminal of the secondary is attached to B+ lead 39 and the other terminal is attached to coil lead 35 through a series connected ammeter 44 and RF choke 45.

In this arrangement gas pressure inside the accelerator tube is adjustable with the tube in situ in the logging sonde. The neutron flux is monitored with the oscillator functioning and while the neutron generator is actually being pulsed.

A pulsed voltage source 46 supplies high voltage (approximately 100 kv.) negative pulses of about 5 microsecond duration and varying in frequency up to 5,000 pulses per second to conductor rod 12. Lower voltage (approximately 4.5 kv.) negative pulses are supplied to extraction electrode 19 by pulsed voltage source 46. U.S. Patent No. 2,907,900 shows and describes a preferred pulse generator which may be used as the pulsed voltage source. This pulse generator system includes a high voltage transformer from which the high voltage pulses are produced. The extraction voltage pulses are derived from the primary voltage pulses of the high voltage transformer and in consequence thereof, correspond in frequency with the high voltage pulses and are approximately coincident to them.

A delay network shown in dashed line block 47 consisting of a small, time-constant RC network, including a series resistor and a capacitor to ground connected to the extraction electrode, functions to change the phase relation between the extraction pulses and the high-voltage pulses so as to delay slightly the ion extraction process until the accelerating voltage has reached the threshold value required for the deuterium-tritium (or deuterium) reaction and provides for most economical introduction of ions into the accelerating gap.

The tube, when being fabricated, is broken at a point 48 for cleaning and introduction of the components of the extraction electrode and the target, after which it is resealed. This remote, isolated position adjacent the narrow, annular space between tube 10 and inner cylinder 13 was selected for breaking so that during the resealing operation the target would not be damaged by the heat needed to reseal the tube.

The capacitive coupling between the high-frequency coil 30, ion plasma 32, and extraction electrode 19, when pulsed, accounts for the supply of ions, which are drawn toward and through the screen mesh 21 of extraction electrode 19 into the acceleration gap 33 between electrode 19 and target 26.

The wire mesh of the screen facilitates dispersion of the ion beam leading into the accelerating gap. The large diameter extraction electrode 19 increases the shielding of the plasma from the high-voltage field effects and eliminates flickering of the plasma during operation of the tube. The wire mesh screen provides a much more uniformly dispersed ion beam with less concentrated heating of the target. The hole fineness of the screen is sufficient to allow ion passage and at the same time shield the plasma from the high voltage field. This results in the formation of much fewer secondary electrons and in the dispersion of those present over wide areas of the tube during its operation.

The screen electrode preferably is formed in the manner illustrated in FIGS. 3 and 4. As shown therein, screen 21a is formed concave-convex, and when it is in position in the generator, the concave surface faces toward the plasma chamber 32 to provide a field configuration that gives still better ion beam dispersion. In addition, the sizes of the screen openings are formed to increase in a radial gradation to improve ion beam dispersion. In this construction, as seen in FIG. 3, a small circle in the center of the screen is made substantially but not completely impervious to the passage of ions which greatly reduces overheating and penetration of the center region of the target 26. Use of screen 21a has improved overall operation of the generator and lengthened the life of target 26.

The raised rim 28 around the edge of target 26 helps to defocus the ion beam, which in turn, spreads the impinging ions over a larger portion of the target face. The bottom configuration of the extraction electrode in conjunction with the target configuration provides an accelerating field which yields a dispersed beam impinging on the target.

An added advantage resulting from dispersion of the ion beam is an improved neutron flux, for dispersion of the beam causes it to cover more uniformly a larger area of the target, thereby enhancing the probability of a deuterium ion encountering a tritium atom and the production of more neutrons per pulse of the generator. This effect becomes more important when it is compared with generator tubes that permit intense, localized heating in spots which results in the replacement of the tritium by deuterium in these overheated spots. Such damage to the target is marked by a sharp drop in 14 mev. neutron production and by a rise in 2.2 mev. neutron production characteristic of the D-D reaction. This latter effect results from the interaction of two deuterons, one impinging on the target as an ion and the other in or near the absorbent material of the target previously occupied principally by tritium prior to damage to the target by overheating.

As discussed above, the metal screen 21 or 21a serves as an extraction electrode and is pulsed negative at about 4.5 kv. to correspond with the 100 kv. negative pulse on the target. It is to be noted that this electrode is directly exposed to plasma 32, contrary to prior art teachings that the electrode should not be exposed to the plasma of the generator because it would be harmful to neutron generation by drawing all the ions of the plasma to the extraction electrode, thereby quenching the plasma, and converting monatomic ions exposed to the metallic electrode to the diatomic state, which due to their increased mass would be difficult to accelerate to the desired velocity in the accelerating gap which would result in not obtaining the high energy neutrons desired.

Advantages of the tube of the invention over known prior art tubes include the following characteristics. There are only two electric leads to the tube interior (other than the leads to the plasma pressure adjustor filament) and there are no metal-to-metal seals maintaining a vacuum inside the tube. The tube is closed by a melted glass seal. A unique ion extraction system based on the capacitive coupling between the external high-frequency coil, the internal ion plasma, and the internal extraction electrode (having an external terminal). The extraction electrode performs the dual function of achieving ion extraction and of shielding the plasma from the high-voltage field. The extraction electrode comprises a wire mesh insert of sufficient hole fineness to allow for ion passage and yet to shield the plasma from the high-voltage field. The bottom configuration of the extraction electrode in conjunction with the target configuration provides an accelerating field which yields a dispersed beam impinging on the target. The delay network in the extraction circuit provides an economical introduction of ions into the accelerating gap. The Kovar lead through provides a rigid mount for the tube, as well as a heat and an electrical conductor to the target within the tube. Thus, the invention provides over-all a workable, economical, and inexpensive energized source of neutrons for operation inside a logging sonde of small bore. The presence of the pressure control filament makes possible the reactivation of tubes that have become inoperative because of either excessive or insufficient deuterium pressure. Heretofore, the reactivation of such tubes has required opening and re-evacuating the glass envelope which is a time-consuming operation. The adjustment of pressure inside the tube usually involved removal of the tube from the logging sonde and heating of the filament by means of a variac-transformer arrangement. Then a guess of the resultant pressure after heating the filament was made on the basis of the strength of glow of the plasma under excitation by an external high-frequency oscillator. This technique has the disadvantage that the tube has to be removed from its pressurized environment inside the logging sonde and must be re-installed before the testing of its efficiency as a neutron generator. The apparatus and circuit described above adjust the deuterium pressure inside the accelerator tube with the tube in situ in the logging sonde and with the oscillator functioning. As illustrated, the deuterium pressure is optimized manually by monitoring the neutron flux when the neutron generator is actually being pulsed; however, the deuterium pressure may be optimized automatically by using the boost voltage as a control for the heating of the filament. The boost voltage is sensitive to changes of deuterium pressure within the tube.

Having fully described the nature, objects, and operation of our invention, we claim:

1. An accelerator tube for use in generating neutrons comprising:
    a closed tube;
    an open-ended cylinder sealed inside said tube;
    an extraction electrode arranged adjacent one end of said cylinder and including a mesh screen dividing said tube into an ionizing chamber and an accelerating chamber;
    a high-frequency coil surrounding the ionizing chamber portion of said tube;
    ion plasma contained within said ionizing chamber;
    a target arranged in the accelerating chamber portion of said tube and spaced from said screen;
    electrical oscillator means connected to said coil adapted to supply continuous high-frequency current to said coil to ionize said plasma;
    a pulsed voltage source connected to said target and to said extraction electrode adapted to apply high-voltage pulses to said target and extraction voltage pulses to said extraction electrode; and
    means connected between said extraction electrode and said pulsed voltage source adapted to change the phase relation between the extraction pulses and high voltage pulses to delay ion extraction until the accelerating voltage has reached the threshold value required for the ion target reaction.

2. An accelerator tube as recited in claim 1 wherein the openings in said screen increase in a radial gradation and are of sufficient fineness to allow ion passage but shield the plasma in the ionizing chamber from the high-voltage field of the accelerating chamber.

3. An accelerator tube as recited in claim 2 wherein said screen is formed concave-convex and is arranged in said tube so that the concave side thereof faces said ionization chamber.

4. An accelerator tube for use in generating neutrons comprising:
    a closed tube;
    an open-ended cylinder sealed inside said tube;
    an extraction electrode arranged adjacent one end of said cylinder and including a mesh screen dividing said tube into an ionizing chamber and an accelerating chamber;
    a high frequency coil surrounding the ionizing chamber portion of said tube;
    ion plasma contained within said ionizing chamber;
    said screen being formed concave-convex and arranged in said tube so that the concave side thereof faces said ionization chamber, and the openings in said screen increase in a radial gradation and are of sufficient fineness to allow ion passage but shield the plasma in the ionizing chamber from the high voltage field of the accelerating chamber;
    a convex, disc-shaped target arranged in the accelerating chamber portion of said tube and spaced from said screen;
    electrical oscillator means connected to said coil adapted to supply continuous high-frequency current to said coil to ionize said plasma;
    a pulsed voltage source connected to said target and to said extraction electrode adapted to apply high voltage pulses to said target and extraction voltage pulses to said extraction electrode;
    means connected between said extraction electrode and said pulsed voltage source adapted to change the phase relation between the extraction pulses and high voltage pulses to delay ion extraction until the accelerating voltage has reached threshold value required for the ion target reaction; and
    control means mounted in said tube for adjusting the gas pressure within the ionizing chamber to reactivate said plasma.

References Cited by the Examiner
UNITED STATES PATENTS

| | | | |
|---|---|---|---|
| 2,960,610 | 11/60 | Gale | 250—84.5 |
| 2,998,523 | 8/61 | Muench et al. | 250—84.5 |
| 3,015,032 | 12/61 | Hoyer et al. | 250—84.5 |
| 3,082,326 | 3/63 | Arnold | 250—84.5 |

RALPH G. NILSON, *Primary Examiner.*
ARCHIE R. BORCHELT, *Examiner.*